United States Patent [19]

Ozawa et al.

[11] Patent Number: 5,024,394
[45] Date of Patent: Jun. 18, 1991

[54] TAPE CASSETTE

[75] Inventors: Kazuo Ozawa, Tokyo; Masanori Sato, Miyagi, both of Japan

[73] Assignee: Sony Corporation, Tokyo, Japan

[21] Appl. No.: 393,549

[22] Filed: Aug. 14, 1989

[30] Foreign Application Priority Data

Sep. 12, 1988 [JP] Japan ................................. 63-228174

[51] Int. Cl.$^5$ ............................................ G11B 23/06
[52] U.S. Cl. .................................... 242/198; 360/132
[58] Field of Search ............... 242/197, 198, 199, 200; 360/132

[56] References Cited

U.S. PATENT DOCUMENTS 3,615,155  10/1971  Golbman ........................ 242/199 X
4,602,303   4/1987  Pertzsch et al. .................... 360/132

FOREIGN PATENT DOCUMENTS

0286355A1  10/1988  European Pat. Off. .
3408694A1   9/1985  Fed. Rep. of Germany .
3510874A1  10/1986  Fed. Rep. of Germany .
2545253    11/1984  France .
62-219384   9/1987  Japan .
2061226A    5/1981  United Kingdom .
2119751    11/1983  United Kingdom .

*Primary Examiner*—Daniel P. Stodola
*Assistant Examiner*—Paul Thomas Bowen
*Attorney, Agent, or Firm*—Philip M. Shaw, Jr.

[57] ABSTRACT

A tape cassette of the type in which a tape-shaped medium having a light transmissivity at a predetermined portion is wound between an upper cassette half and a lower cassette half so as to surround a light emitting element insertion portion, a light receiving window is formed through a side wall of the upper cassette half or the lower cassette half so as to oppose to the light emitting element insertion portion across the tape, whereby when the tape cassette is loaded into a recording and reproducing apparatus, a light emitting element is inserted into the light emitting element insertion portion and a light receiving element is located outside of the light receiving window, thereby detecting the predetermined portion of the tape-shaped medium and wherein light-shielding ribs formed on the upper cassette half or the lower cassette half so as to face to each other across a light path extend from the light receiving element insertion portion to the light receiving window, and a tunnel core piece member is provided among the side wall having the light receiving window and the light-shielding ribs so as to surround the light path, whereby even when the tape cassette is formed as a color tape cassette, a start sensor or an end sensor can be prevented from malfunctioning.

13 Claims, 9 Drawing Sheets

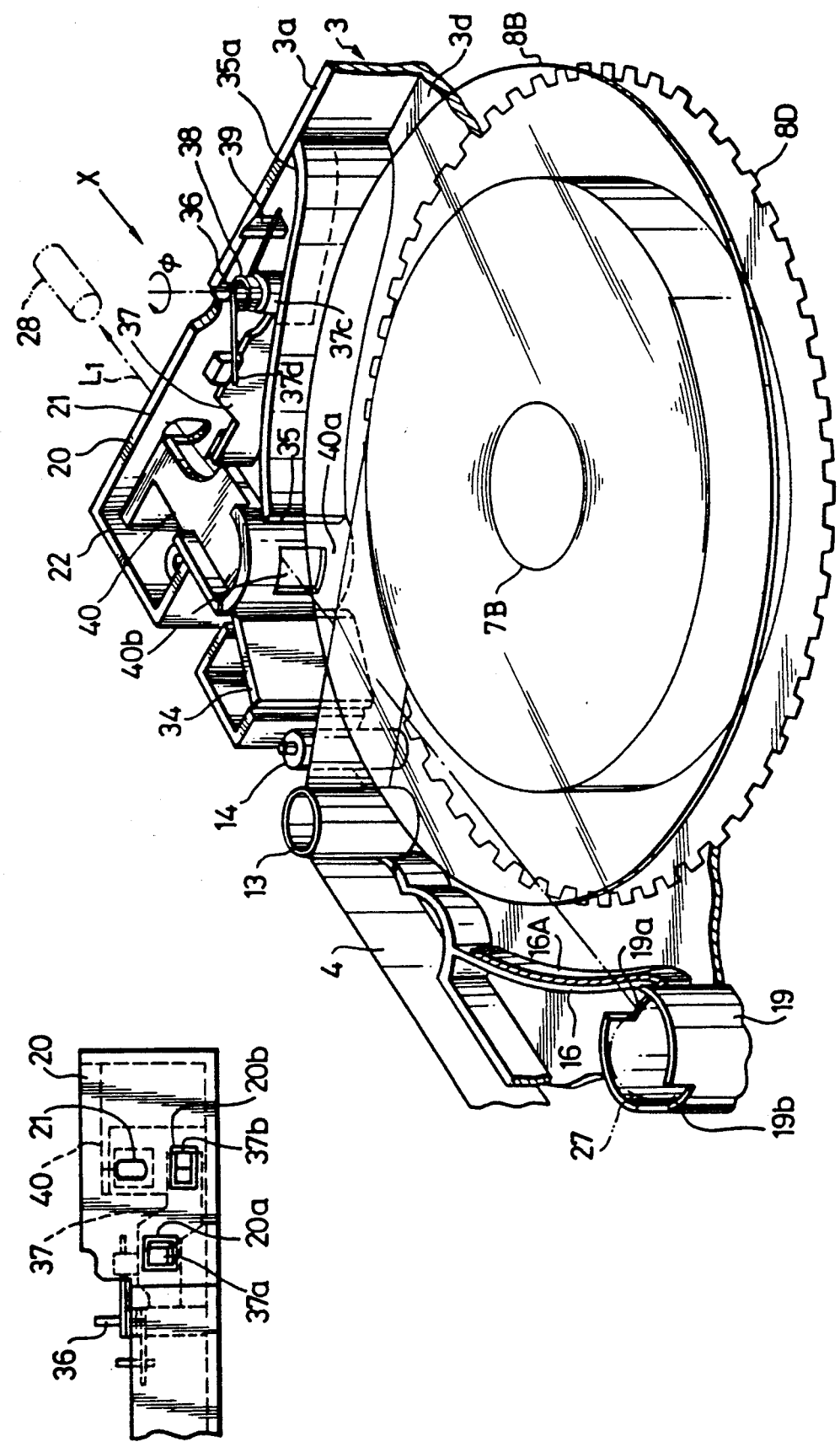

TAPE CASSETTE

BACKGROUND OF THE INVENTION

1. Field of the Invention

The present invention relates generally to tape cassettes and, more particularly, is directed to a tape cassette suitable as a so-called color tape cassette of a video tape recorder (VTR).

2. Description of the Prior Art

A tape cassette having wound therein a magnetic tape is useful in order to simplify the loading or unloading of a recording and reproducing magnetic tape in a video tape recorder. It is convenient for a user when this tape cassette is loaded into the video tape recorder, if the video tape recorder can automatically determine whether the magnetic tape within the tape cassette is in the rewound state (start mode) or whether the magnetic tape is in the wound state (end mode). For this reason, the tape cassette is generally provided with a mechanism, by which the start mode or the end mode of the magnetic tape can be detected from the outside of the cassette.

FIG. 1 shows such a prior-art tape cassette which is generally designated by reference numeral 1. In FIG. 1, reference numeral 2 denotes an upper cassette half, 3 a lower cassette half and 4 a magnetic tape. A transparent leader/trailer tape 4a is connected to the respective ends of the magnetic tape 4. A guard panel 5 protects the magnetic tape 4 from dust, smudges, finger marks and so on. Transparent windows 6A, 6B are formed on the upper cassette half 2 so that the inside of the tape cassette 1 can be visually confirmed.

FIG. 2 shows the lower cassette half 3 of the prior-art tape cassette of the example shown in FIG. 1. It will be seen that the magnetic tape 4 is supplied from a supply reel 7A and is taken up by a take-up reel 7B after having passed over a guide pole 11, a tape guide 12, a front panel 3b of the lower cassette half 3, a tape guide 13 and a guide roller 14. The supply reel 7A is held between a reel flange portion 8A and a lower reel flange (not shown), and the take-up reel 7B is held between a reel flange 8B and a lower reel flange (not shown). Brake levers 9A and 9B are respectively engaged with lower reel flanges (not shown), and these brake levers 9A and 9B are operated by a release mechanism 10 from the outside.

Along the front panel 3b, arcuate front ribs 15 and 16 are formed to be substantially coaxial with the supply reel 7A and the take-up reel 7B, whereby a space 17 is formed between the magnetic tape 4 and the front rib 15. Also, a space 18 is formed on the front panel 3b. Loading posts (not shown) of a video tape recorder are inserted into these spaces 17 and 18 when the tape cassette is loaded into the video tape recorder. A cylindrical wall 19 is formed in a portion where the front ribs 15 and 16 intersect. Through the cylindrical wall 19, there are provided lighting windows 19a and 19b in an opposing relation with an angular extent of substantially 180 degrees.

One end of a side wall 3a of the lower cassette half 3 near the side of the take-up reel 7B is recessed to form a partition 20 as shown in FIG. 3. The partition 20 is covered with the guard panel 5. As shown in FIG. 3, apertures 20a, 20b and a light receiving window 21 are formed through the partition 20. Two partitions 22, 23 extend from the lower cassette half 3 perpendicular to the partition 20 and aligned slits 22a, 23a are respectively formed on the partitions 22, 23. Rotating shafts 24c and 24d of a lid locking member 24 are engaged with the above-mentioned slits 22a and 23a, and the lid locking member 24 is generally spring-biased by a spring (not shown) in the direction shown by $\Theta$ in FIG. 3. Accordingly, as shown in, for example, FIG. 1, a lock-releasing pin 24a and a lock lever 24b of the lid locking member 24 are projected to the outside through the apertures 20a and 20b of the partition 20, and the lock lever 24b is engaged with a lock slit 5a of the guard panel 5 (when the guard panel 5 is in its normally closed position). When the guard panel 5 is opened, as shown in FIG. 1, the engagement between the lock lever 24b and the lock slit 5a has to be released by inwardly pushing the lock releasing pin 24a.

A side wall 3c of the lower cassette half 3 is parallel to the side wall 3a. Further, one end of the side wall 3c at its position near the side of the supply reel 7A is concave to provide a partition 25 covered with the guard panel 5 as shown in FIG. 4. As shown in FIG. 4, a light receiving window 26 of a slit configuration is formed in the partition 25.

To enable the video tape recorder to determine whether the magnetic tape 4 is in the start mode or in the end mode after the tape cassette 1 shown in the example of FIG. 1 is loaded into the video tape recorder, as shown in FIGS. 1 and 2, a light emitting element 27 is inserted into the cylindrical wall 19 of the lower cassette half 3 and a start sensor 28 and an end sensor 29, each formed of a light receiving element, are located outside the light receiving windows 21 and 26. When the transparent leader tape 4a intersects an optical axis $L_1$ connecting the lighting window 19a and the light receiving window 21, the start sensor 28 generates a signal, while when the transparent trailer tape 4a intersects an optical axis $L_2$ connecting the lighting window 19b and the light receiving window 26, the end sensor 29 generates a signal. Thus, the video tape recorder can determine whether the magnetic tape 4 is in the start mode or in the end mode.

In the prior-art tape cassette, the upper cassette half 2 and the lower cassette half 3 are both made of a black (light absorption property) resin so that the light emitted from the light emitting element 27 of the tape cassette which is inserted into the video tape recorder is hardly reflected irregularly within the housing of the tape cassette. Also, lights from various light sources located outside the tape cassette cannot pass through the upper cassette half 2 into the inside of the tape cassette to be reflected on its inside wall and leaked to the outside through the light receiving windows 21, 26. Consequently, the start sensor 28 and the end sensor 29 are prevented from malfunctioning.

With the spreading use of video tape recorders, however, it is desirable that a video tape recorder cassette be formed as a so-called color tape cassette. The applicants have made experiments wherein colors of the upper cassette half 2 and the lower cassette half 3 are changed to colors other than black, for example, gray and green. The experimental results revealed that, as shown in FIG. 3, an irregularly-reflected light $L_3$ from the bottom plate 3d of the lower cassette half 3, an irregularly-reflected light $L_4$ from the reel flange 8B, an external illumination light $L_5$ passing through the upper cassette half 2 and so on enter the second sensor 28 through the light receiving window 21. There is then presented the problem that the start sensor 28 is caused to malfunction when the magnetic tape 4 is not in the start mode. The end sensor 29 suffers from a similar problem.

Japanese Laid-open Utility Model No. 62-57983 discloses a tape cassette in which, while the color thereof remains black, a cylindrical light-shielding member is provided near the light receiving window 21 in association with the lid locking member 24 (see FIG. 2) so as to improve the operation of the start sensor 28.

In the production of the above-mentioned tape cassette, a complicated mechanism is required to fix the light-shielding member, and the assembly-process of the tape cassette becomes complicated. Also, the light-shielding member can only be applied to tape cassette which the lid locking member 24.

SUMMARY OF THE INVENTION

It is a general object of the present invention to provide an improved tape cassette which is free of the above-mentioned defects encountered with the prior-art tape cassette.

More specifically, it is an object of the present invention to provide a tape cassette in which an upper cassette half or a lower cassette half can be made of a material whose color is other than black without causing a light receiving element to malfunction.

It is another object of the present invention to provide a tape cassette for which the assembly-process can be simplified.

According to an aspect of the present invention, there is provided a tape cassette in which a tape-shaped medium having a predetermined transparent portion is wound between an upper cassette half and a lower cassette half so as to surround a light emitting element insertion portion. A light receiving window is formed through a side wall of said upper cassette half or said lower cassette half so as to oppose to said light emitting element insertion portion across said tape. When said tape cassette is loaded into a recording and reproducing apparatus, a light emitting element is inserted into said light emitting element insertion portion and a light receiving element is located outside of said light receiving window, thereby detecting the predetermined portion of said tape-shaped medium. This tape cassette comprises:

(a) light-shielding ribs formed on said upper cassette half or said lower cassette half so as to face each other across a light path extending from said light receiving element insertion portion to said light receiving window; and (b) a tunnel core piece member provided between said side wall having said light receiving window and said light-shielding ribs so as to surround said light path.

These and other objects, features and advantages of the present invention will be apparent in the following detailed description of preferred embodiments when read in conjunction with the accompanying drawings, wherein like reference numerals are used to identify the same or similar parts in the several views.

BRIEF DESCRIPTION OF THE DRAWINGS

FIG. 7A is a perspective view illustrating a main portion of the side of the lower half of the embodiment according to the present invention in an enlarged scale;

FIG. 7B is a schematic diagram of FIG. 7A as seen from the X direction in FIG. 7A;

DETAILED DESCRIPTION OF PREFERRED EMBODIMENTS

The present invention will now be described in detail with reference to FIGS. 5 to 10. In FIGS. 5 to 10, like parts corresponding to those of FIGS. 1 to 4 are marked with the same references and therefore will not be described in detail. In this embodiment, the upper cassette half and the lower cassette half are colored to have light reflection properties for colors other than black.

Figure 1:
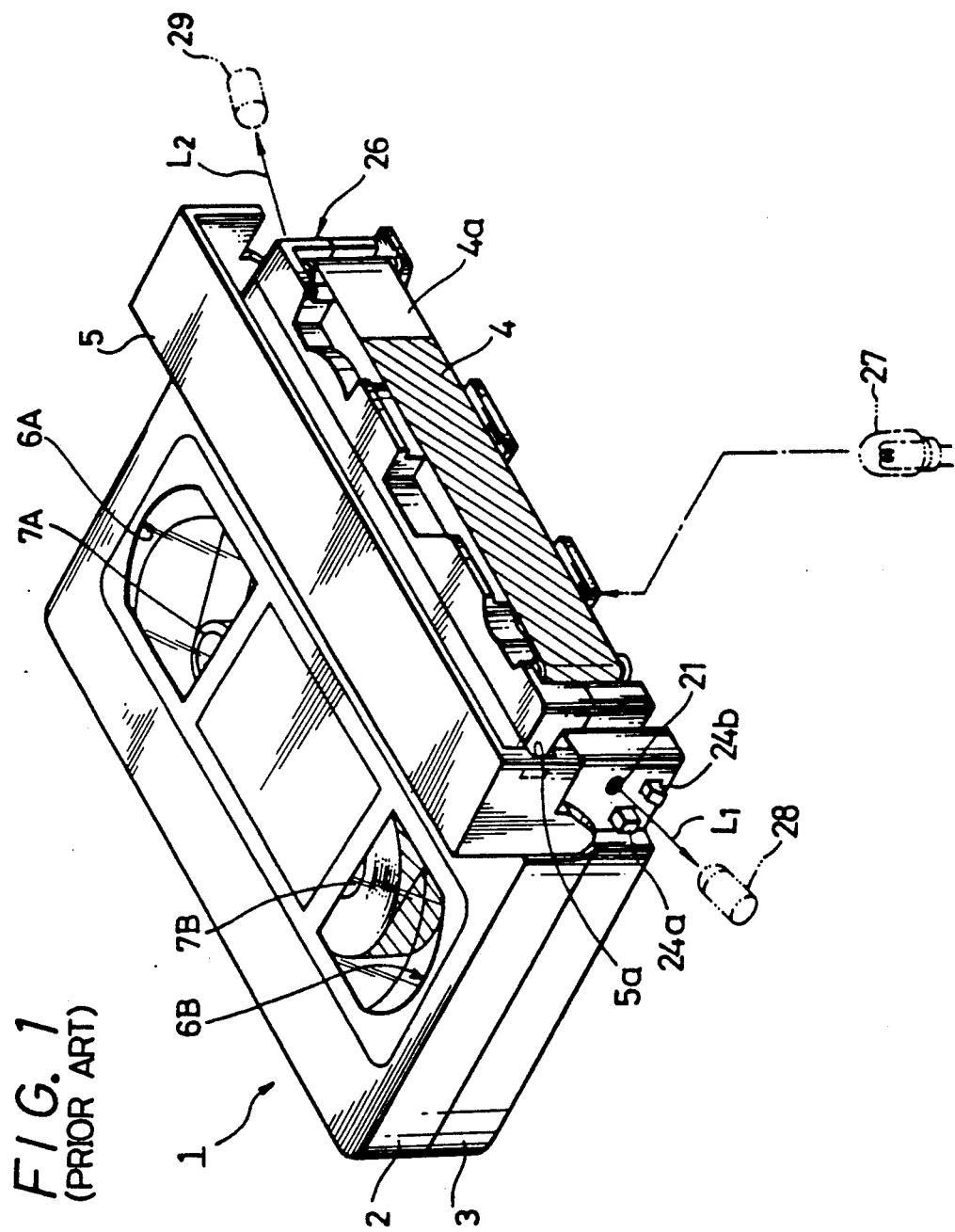
FIG. 1 is a perspective view of a prior-art tape cassette.
Figure 2:
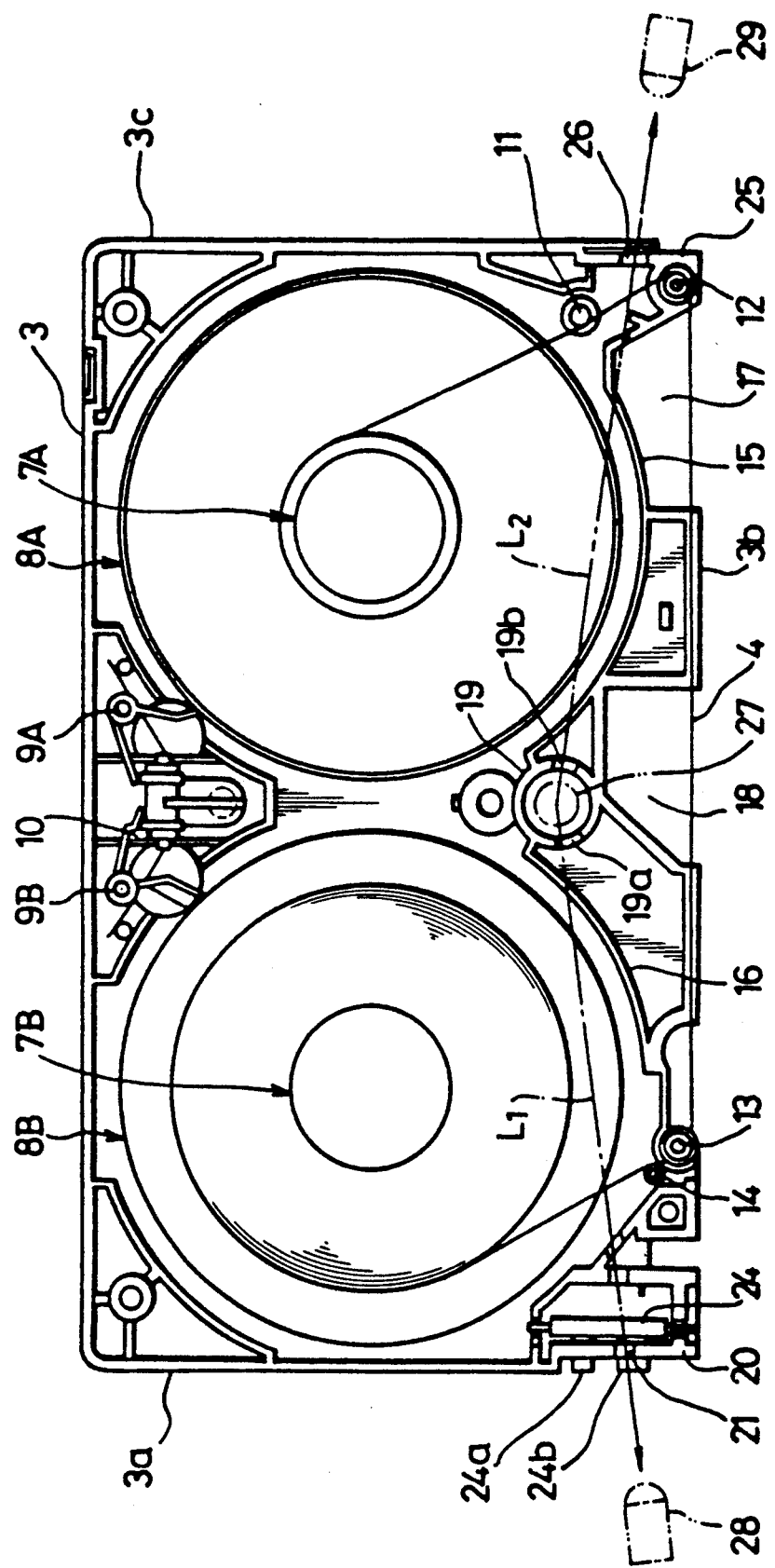
FIG. 2 is a plan view of a lower cassette half of the prior-art tape cassette shown in FIG. 1.
Figure 3:
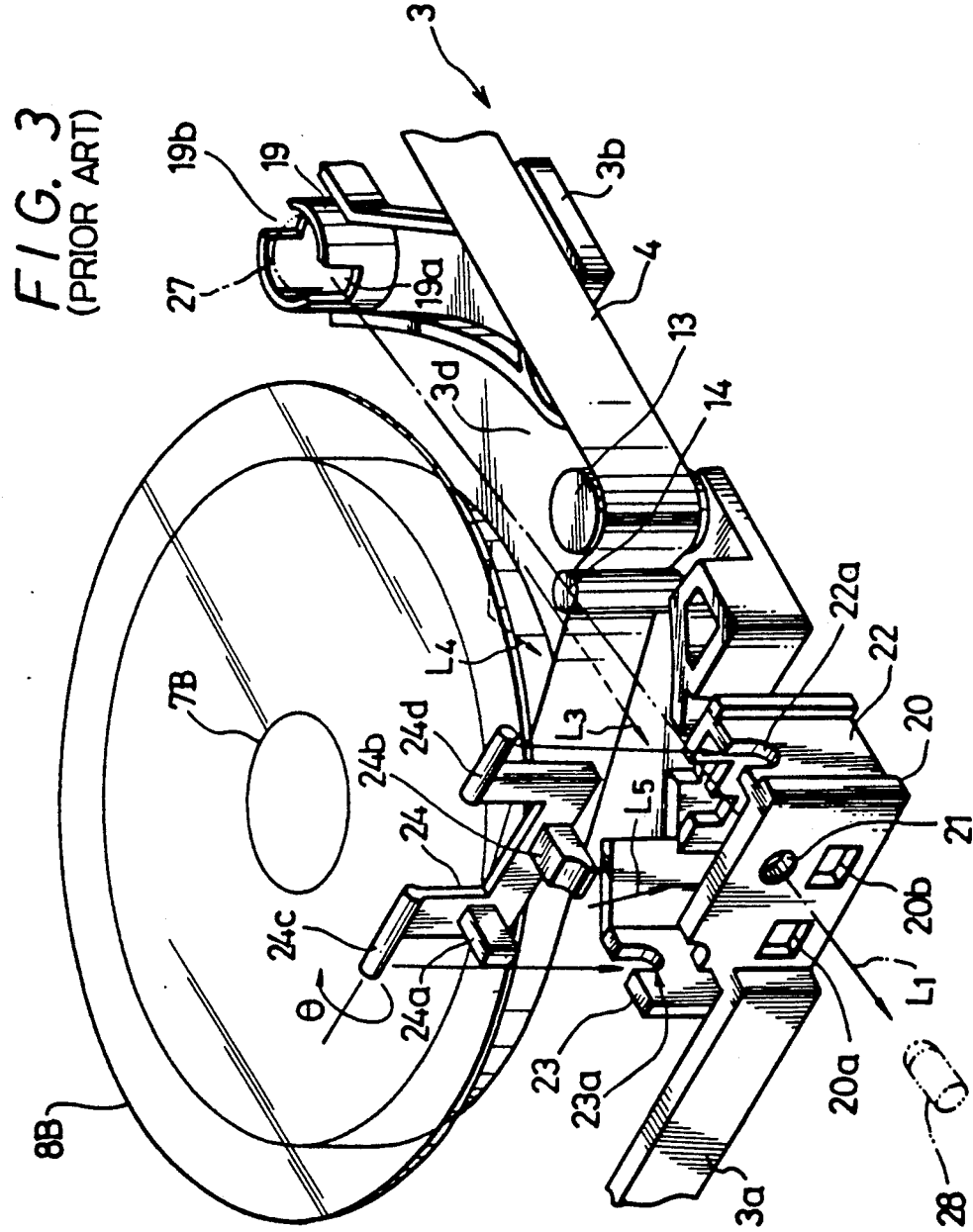
FIG. 3 is a fragmentary, enlarged, perspective view of a main portion of a take-up reel side of the example shown in FIG. 2.
Figure 4:
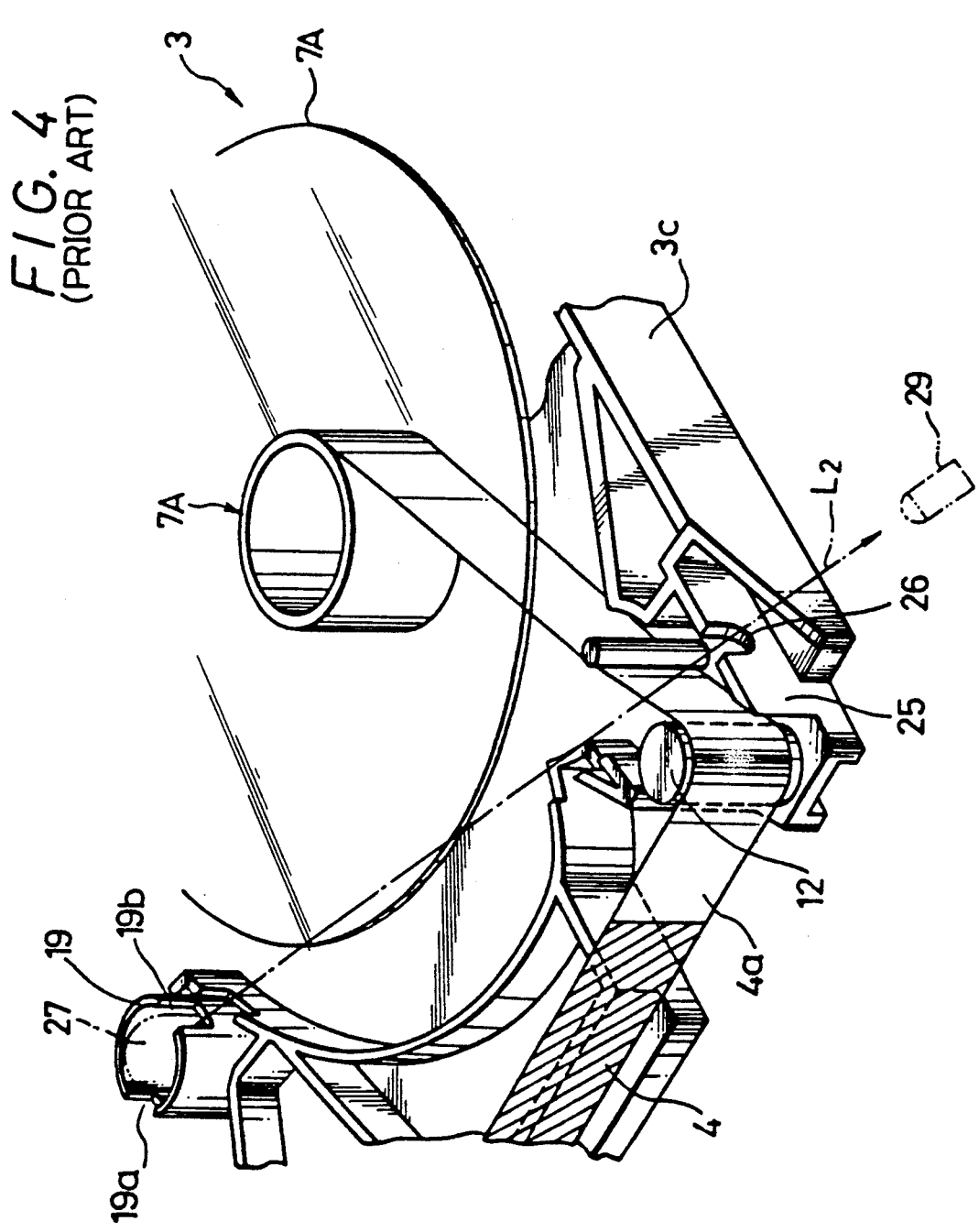
FIG. 4 is a fragmentary, enlarged, perspective view of a main portion of a supply reel side of the example shown in FIG. 2.
Figure 5:
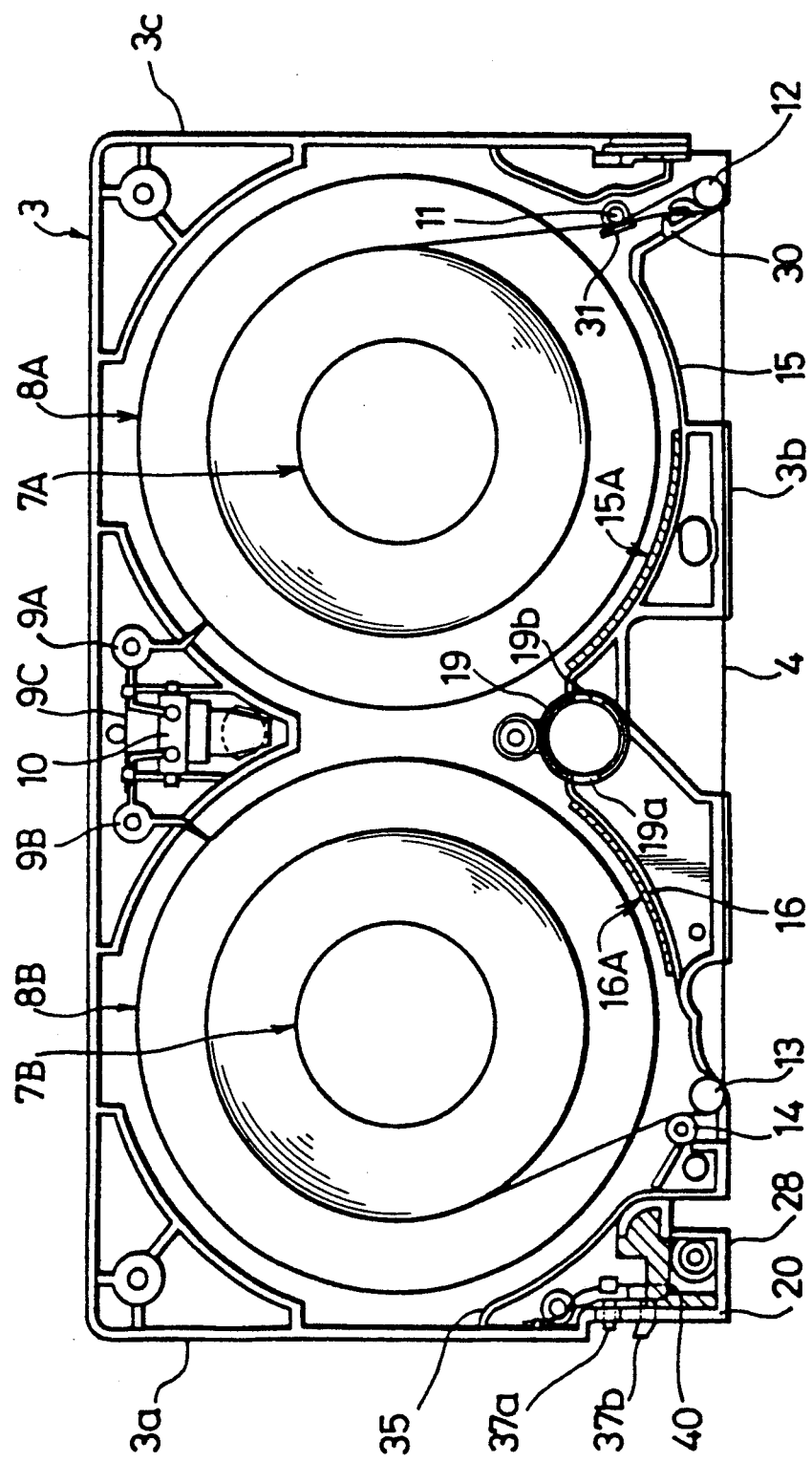
FIG. 5 is a plan view of an embodiment of a tape cassette according to the present invention and illustrates the side of a lower cassette half thereof.

FIG. 5 shows the lower cassette half 3 of an embodiment of the tape cassette according to the present invention.

Referring to FIG. 5, it will be seen that the brake levers 9A, 9B are spring-biased by a single spring 9C in the direction of the release 10. A tape pad 31 is inserted into a slit forming portion 30 near the tape guide 12, whereby the magnetic tape 4 is sandwiched between the tape pad 31 and the guide pole 11.

Figure 6:
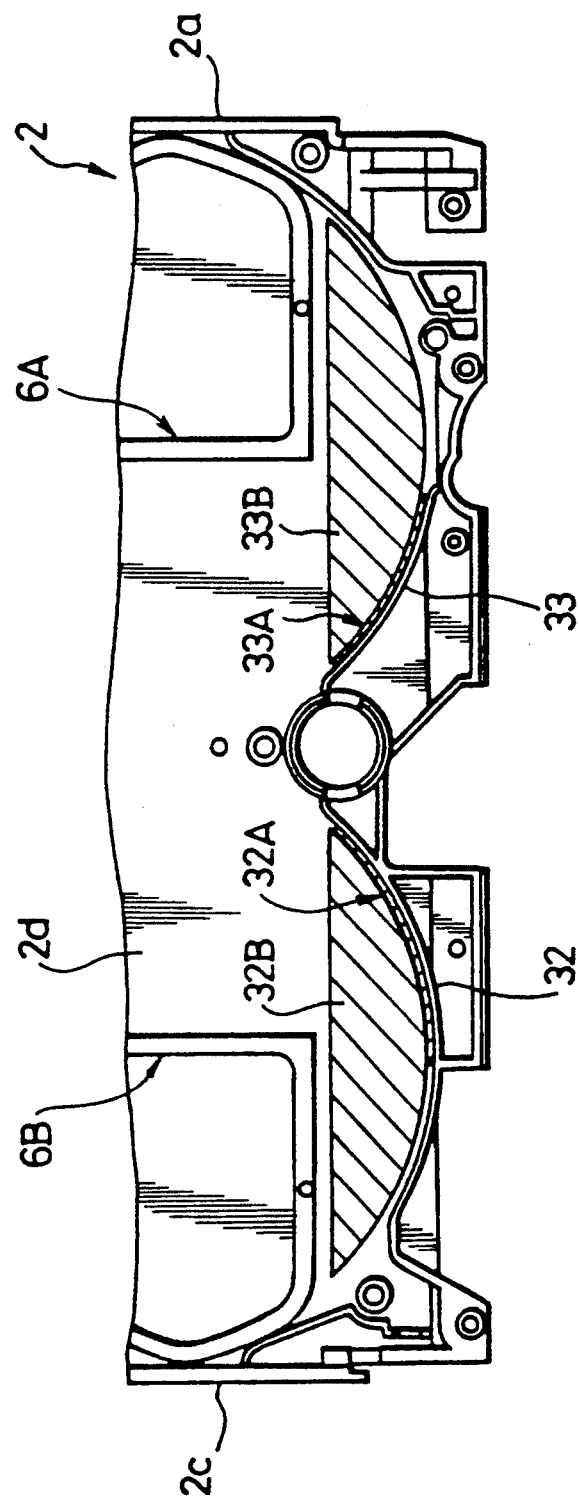
FIG. 6 is a bottom view of an upper cassette half of a tape cassette according to the present invention.

Black sheets 15A and 16A are respectively bonded to the inner surfaces of the front ribs 15 and 16 formed on the lower cassette half 3. In association with these black sheets 15A and 16A black sheets 32A and 33A, as shown in FIG. 6, are respectively bonded to the inner surfaces of front ribs 32 and 33 formed on the upper cassette half 2 according to this embodiment. With respect to the upper cassette half 2, black sheets 32B and 33B are bonded to the inside surface of a top plate 2d of the upper cassette half 2.

As shown in FIG. 7A, ribs 34 and 35 extend from a bottom plate 3d of the lower cassette half 3 near the supply reel 7B side so that they are on opposite sides of the light path $L_1$ extending from the lighting window 19a of the cylindrical wall 19 to the light receiving window 21. The light emitting element 27 is inserted into the cylindrical wall 19. The rib 35 is erected on the bottom plate 3d of the lower cassette half 3 so that it substantially perpendicularly abuts against the side wall 3a. The rib 35 becomes substantially arcuate along the periphery of the lower reel flange 8D. The most important feature of the rib 35 is that it extends to a portion 35a surrounded by a broken line in FIG. 7A. This extended portion 35a of the rib 35 can prevent the light emitted from the light emitting element 27 and irregularly reflected by the reel flange 8B, or the like, from reaching the light receiving window 21.

In FIG. 7A, reference numeral 36 designates a shaft which is implanted on the bottom plate 3d of the lower cassette half 3. A cylindrical portion 37c of a lid locking member 37 is rotatably engaged with the shaft 36, and a helical or coiled spring 38 is wound around the shaft 36 above the cylindrical portion 37c. One end of the coiled spring 38 is brought in contact with a spring stop 39 formed on the side wall 3a of the lower cassette half 3 while the other end thereof is brought in contact with a spring stop 37d of the lid locking member 37, whereby the lid locking member 37 is constantly spring-biased around the shaft 36 in the $\phi$ direction. As shown in FIG. 7B, a lock-releasing pin 37a and a lock lever 37b of the lid locking member 37 are respectively projected through the apertures 20a and 20b formed through the partition 20 of the lower cassette half 3 to the outside thereof and maintained in that condition.

Figure 8A:
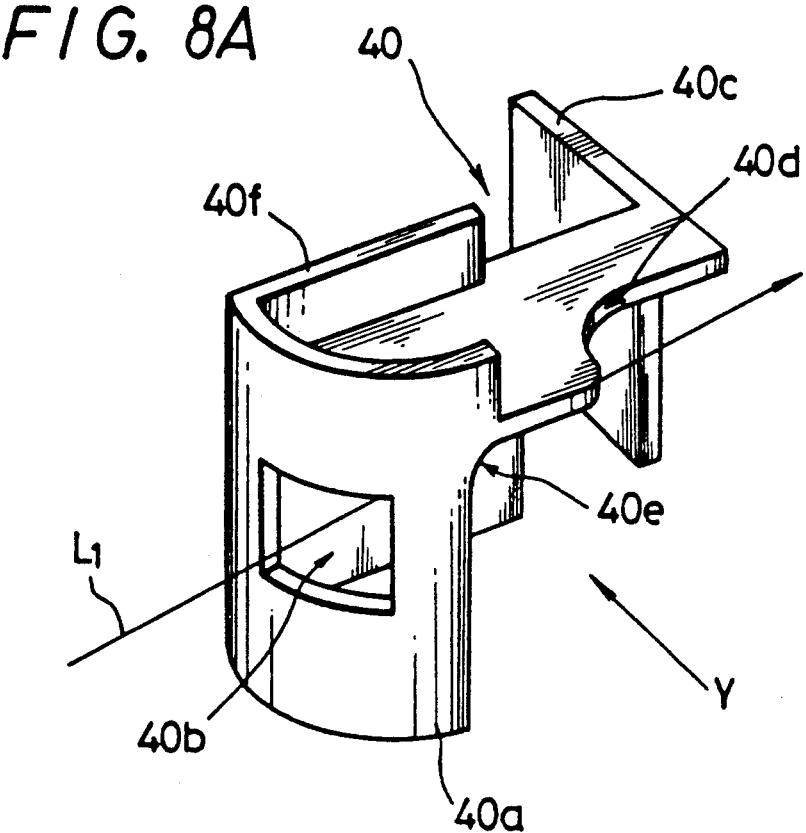
FIG. 8A is a perspective view of a tunnel core piece member used in the embodiment of the present invention.
Figure 8B:
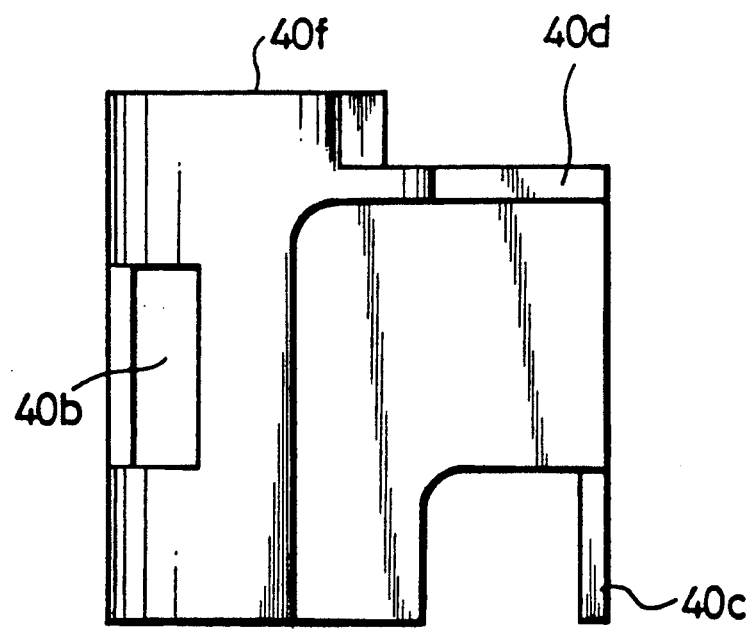
FIG. 8B is a schematic diagram of FIG. 8A as seen from the Y direction in FIG. 8A.

In this embodiment, as shown in FIG. 7A, a member 40 is sandwiched among the partition 20, having the light receiving window 21, and the ribs 34 and 35 in such a manner that it surrounds the light path $L_1$. This member 40 will hereinafter be referred to as the tunnel core piece member and is molded of black polystyrene resin. One end portion 40a of the tunnel core piece member 40 is curved along the rib 35, and an opening portion 40b is formed through the curved portion 40a of the tunnel core piece member 40 so as to surround the light path $L_1$. FIGS. 8A and 8B illustrate the above-mentioned tunnel core piece member 40 more in detail.

Referring also to FIGS. 8A and 8B, it can be seen that the other end 40c of the tunnel core piece member 40 is extended to come in contact with the partition 22 of the lower cassette half 3 and that the tunnel core piece member 40 is concave to provide concave portions 40d and 40e so that it may not hinder the rotation of the lid locking member 37. Also, the curved portion 40a is increased in height to form an upper end 40f so that when the upper cassette half 2 is coupled to the lower cassette half 3, the upper end 40f abuts against the top plate 2d of the upper cassette half 2. Thus, after the tunnel core piece member 40 is inserted into the lower cassette half 3 and the upper cassette half 2 is attached to the lower cassette half 3, the tunnel core piece member 40 will be positively secured between the upper cassette half 2 and the lower cassette half 3.

With respect to the tape cassette of this embodiment, we have measured the light irregularly-reflected within the tape cassette and the light entering the tape cassette from the outside with the upper cassette half 2 and the lower cassette half 3 colored as on Table 1.

TABLE 1

| Colors of upper cassette half and lower cassette half | Measuring Conditions |
| --- | --- |
| Red, wine red blue, dark blue, light blue dark gray | 1. (a) Black sheets present (b) Black sheets absent |
| dark green gunmetal gray dark brown | 2. (a) Tunnel core piece member present (b) Tunnel core piece member absent |

With each color on Table 1, we have compared the amount of light leaked to the light receiving window 21 in the presence and absence of the black sheets 15A, 16A (see FIG. 5) attached to the inside surfaces of the front ribs 15, 16. Thereafter, we have compared the amount of light leaked to the light receiving window 21 in the presence and absence of the black tunnel core piece member 40 inserted into the lower cassette half 3.

The results reveal that the presence of the black sheets 15A, 16A reduces the amount of light leaked to the light receiving window 21 by about 10% regardless of the colors of the upper cassette half 2 and the lower cassette half 3. Further, results also reveal that the presence of the black tunnel core piece member 40 reduces the amount of light leaked to the light receiving window 21 by about 80%.

In particular, the amount of light leaked to the light receiving window 21 is very small when the colors of the upper cassette half 2 and the lower cassette half 3 are dark green, dark brown and gunmetal gray.

As described above, according to the tape cassette of this embodiment, since the rib 34 and the extended rib 35 are erected on the lower cassette half 3 so as to be on opposite sides of the light path $L_1$ and the black tunnel core piece member 40 is provided so as to surround the light path $L_1$, it is possible to reduce the amount of stray light leaked to the light receiving window 21.

Therefore, even when the upper cassette half 2 and the lower cassette half 3 are colored by other colors than black, upon loading the cassette into the video tape recorder, the start sensor 28 will be prevented from malfunctioning.

Further, since the black sheets 15A, 16A are bonded to the front ribs 15, 16 in this embodiment, it is possible to further reduce the amount of stray light leaked to the light receiving window 21.

The tunnel core piece member 40 of this embodiment is provided with the concave portions 40d and 40e, by which the rotation of the lid locking member 37 used in this embodiment is not hindered. Furthermore, since the tunnel core piece member 40 is fixed only by assembling the upper cassette half 2 on the lower cassette half 3 after the tunnel core piece member 40 is inserted into the lower cassette half 3, the assembly-process of the tape cassette of this embodiment can be greatly simplified. In this case, the tunnel core piece member 40 might be bonded to the bottom plate 3d of the lower cassette half 3 by a bonding agent.

Figure 9:
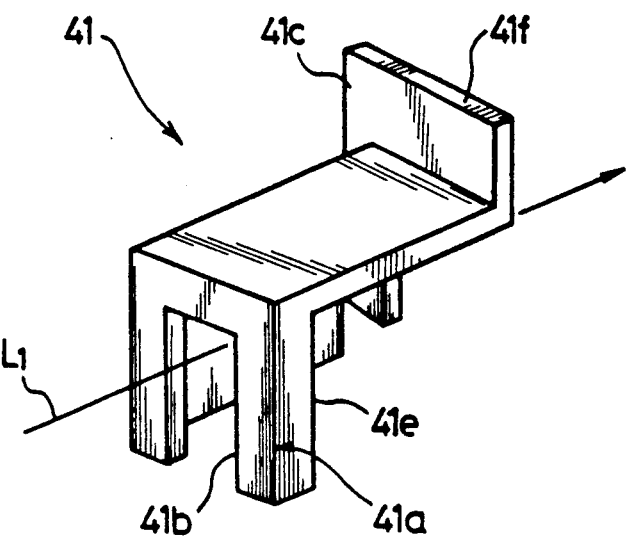
FIGS. 9 and 10 are perspective views of other examples of the tunnel core piece members used in the present invention.

While the above-mentioned embodiment utilizes the tunnel core piece member 40 shown in FIGS. 8A and 8B, the tunnel core piece member 40 can be replaced with a tunnel core piece member 41 shown in FIG. 9.

As shown in FIG. 9, the tunnel core piece member 41 is comprised of a slit 41b surrounding the light path $L_1$, a positioning reference corner portion 41a, an extended portion 41c and an abutting surface portion 41f. The tunnel core piece member 41 in the example shown in FIG. 9 is simple in arrangement and can be manufactured with ease.

Figure 10:
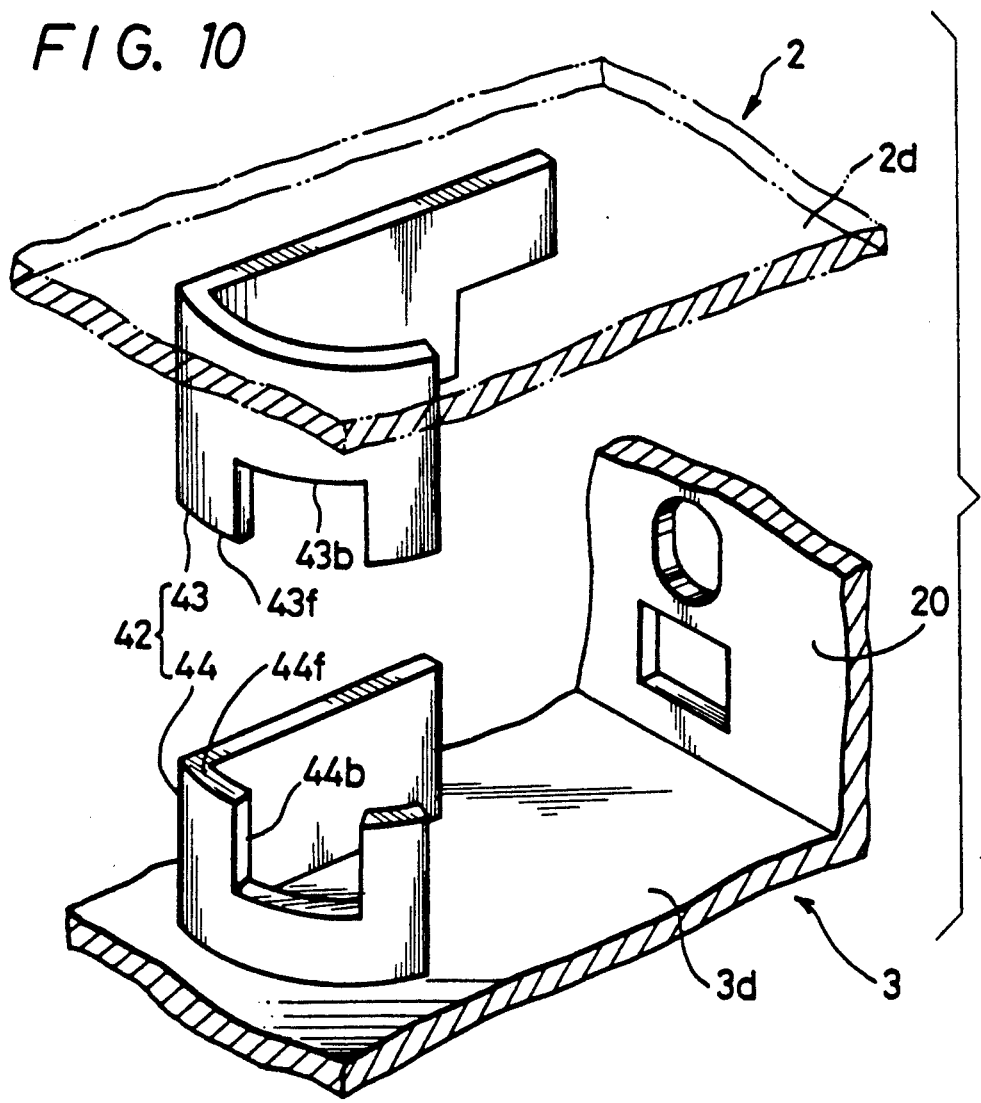

Alternatively, the tunnel core piece members 40 and 41 may be replaced with a tunnel core piece member 42, the respective parts of which are formed as parts of the upper cassette half 2 and the lower cassette half 3 as shown in FIG. 10.

In FIG. 10, reference numeral 43 designates a rib implanted on the top plate 2d of the upper cassette half 2 and 44 a rib implanted on the bottom plate 3d of the lower cassette half 3. When the upper cassette half 2 is assembled on the lower cassette half 3, abutting surfaces 43f and 44f are abutted against each other so that cut-away portions 43b and 44b are connected each other to form an opening portion through which the light path $L_1$ passes. In this case, the inner surfaces of the ribs 43 and 44 might be coated with a black paint. It is obvious that if the tunnel core piece member 42 of the example shown in FIG. 10 is used, then it is possible to reduce the amount of light leaked to the light receiving window 21 similarly to the tunnel core piece member 40 of the example shown in FIGS. 8A and 8B.

While in the above-mentioned embodiments the tunnel core piece members 40 and 41 are made of black material, the present invention is not limited to the above black material and the tunnel core piece members 40 and 41 may be made of material whose color is, for example, the same as that of the upper cassette half 2 and the lower cassette half 3. When the tunnel core piece members 40 and 41 are made of a material whose color is other than black, the thickness of each of the tunnel core piece members 40 and 41 should be increased.

If the color of the windows 6A and 6B (see FIG. 1) formed for visually confirming the inside of the tape cassette is selected to be gray or blue-based semitransparent or if the color of the reel flanges 8A and 8B is selected to be gray-based semitransparent, the amount of light leaked to the light receiving windows 21 and 26 will be reduced.

According to the tape cassette of the present invention, the light-shielding ribs are formed on the upper cassette half or on the lower cassette half facing each other across the light path extending from the light emitting element insertion portion to the light receiving windows, and the tunnel core piece member is inserted into the lower cassette half so as to surround the light path, causing the light irregularly reflected within the upper cassette half or the lower cassette half, and the light passing through the upper cassette half or the lower cassette half to be prevented from entering the light receiving windows.

Therefore, if this tape cassette is formed as a color tape cassette, or the upper or lower cassette half thereof is made of a bright (reflective) material of a color other than black, so as to increase the merit from a product standpoint, when the tape cassette of the invention is loaded into a video tape recorder, the start sensor and the end sensor will be prevented from malfunctioning.

Further, since the tunnel core piece member is simply inserted into the lower cassette half or the upper cassette half, the assembly-process of the tape cassette of the present invention can be simplified.

Further yet, when the tunnel core piece member is formed as one body with the lower cassette half or the upper cassette half, the assembly-process of the tape cassette of the present invention can be simplified more.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

We claim:

1. An improved tape cassette of the type having an upper cassette half and a lower cassette half, and a light emitting element insertion portion located therebetween, a tape-shaped medium having a light transmissive portion wound between the upper and lower cassette halves and surrounding the light emitting element insertion portion, and a light receiving window through a side wall of the cassette so as to oppose the light emitting element insertion portion across the tape-shaped medium, whereby when the tape cassette is loaded into a recording and reproducing apparatus, a light emitting element can be inserted into the light emitting element insertion portion and a light receiving element can be located outside of the light receiving window, to thereby establish a light path therebetween and allow detection of the predetermined portion of the tape-shaped medium, wherein the improvement comprises:

(a) light-shielding ribs, one of the ribs extending up to a substantially central portion of the cassette side wall having the light receiving window, the ribs being formed between the upper cassette half and the lower cassette half on opposite sides of the light path extending from the light receiving element insertion portion to the light receiving window; and (b) a tunnel piece member provided between the light-shielding ribs and substantially extending to the side wall having the light receiving window so as to surround the light path.

2. A tape cassette according to claim 1, wherein the tunnel piece member is integrally formed with the upper cassette half and the ribs are formed as one body with the upper cassette half.

3. A tape cassette according to claim 1, wherein light-shielding front ribs are formed between the upper cassette half and the lower cassette half adjacent to the light emitting element insertion portion, the front ribs have inner surfaces with respect to the exterior surface of the cassette halves and black sheets are bonded to the inner surfaces of the front ribs of the upper and lower cassette halves.

4. A tape cassette according to claim 1, wherein the tunnel piece member is made of a black material.

5. A tape cassette according to claim 1, wherein the tunnel piece member is made of a material whose color is other than black.

6. A tape cassette according to claim 1, wherein the upper cassette half is made of a material having a color other than black.

7. The tape cassette of claim 1, wherein the tunnel piece member is curved along a first end portion which spans between the ribs.

8. The tape cassette of claim 7, wherein the lower cassette half has a partition, and a second end portion of the tunnel piece member contacts the partition near the cassette side wall.

9. The tape cassette of claim 1, wherein the cassette has a lid locking member, the tunnel piece member having at least one concave portion so that the lid locking member can rotate without hindrance.

10. A tape cassette according to claim 1, wherein the tunnel piece member is integrally formed with the upper cassette half and the ribs are formed as one body with the lower cassette half.

11. A tape cassette according to claim 1, wherein the tunnel piece member is integrally formed with the lower cassette half and the ribs are formed as one body with the upper cassette half.

12. A tape cassette according to claim 1, wherein the tunnel piece member is integrally formed with the lower cassette half and the ribs are formed as one body with the lower cassette half.

13. A tape cassette according to claim 1, wherein the lower cassette half is made of a material having a color other than black.

* * * * *